United States Patent Office 3,406,509
Patented Oct. 22, 1968

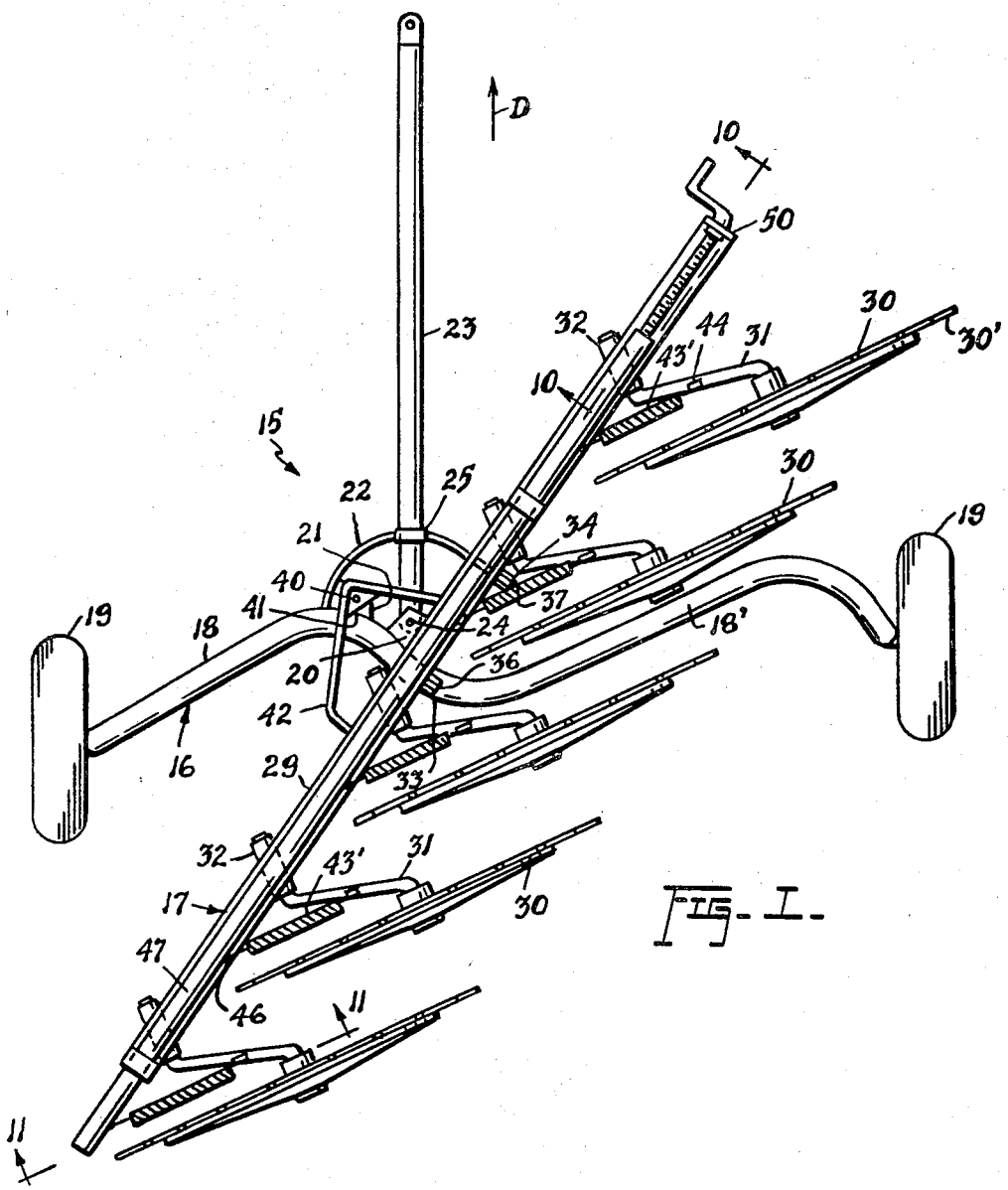
Fig. I.

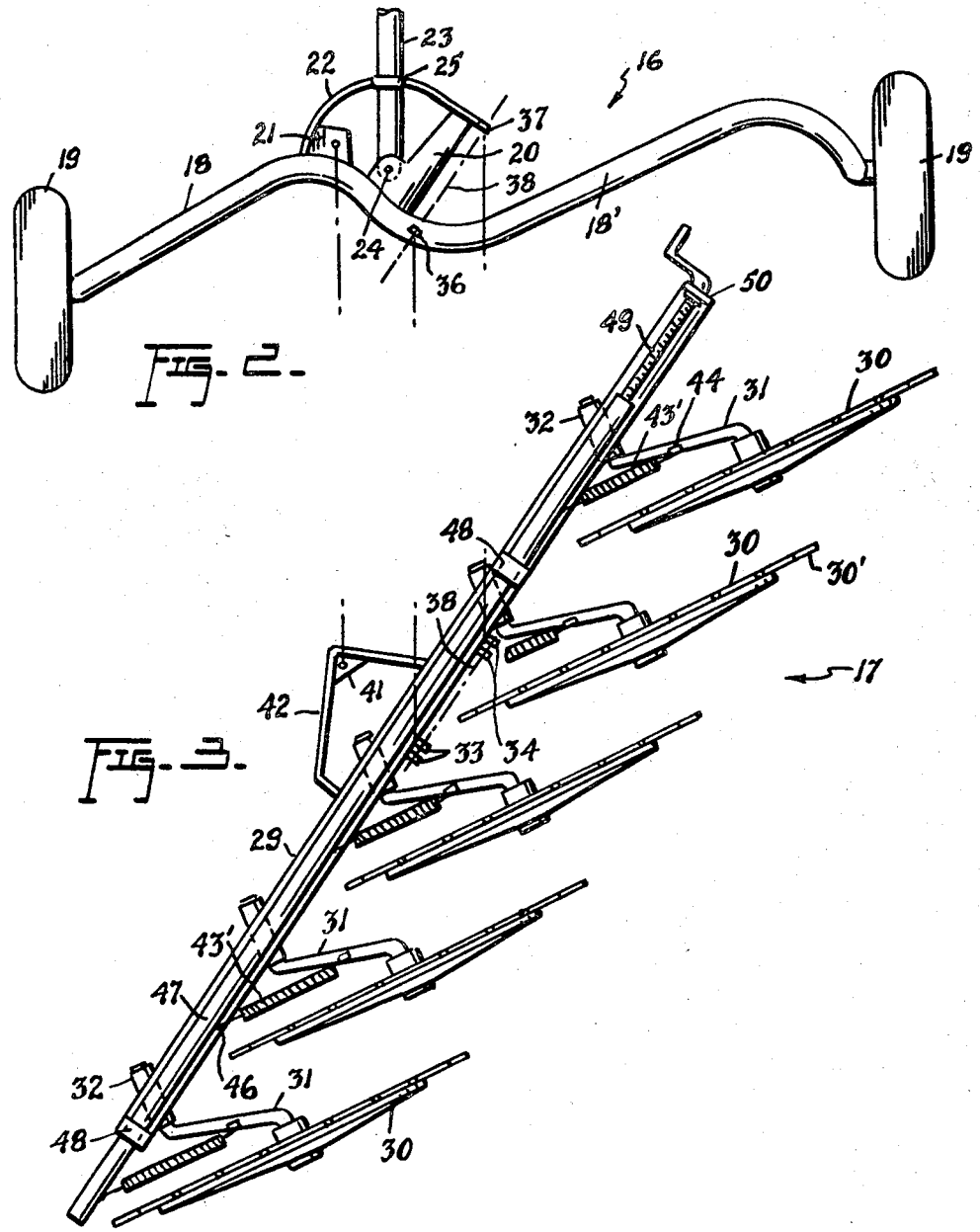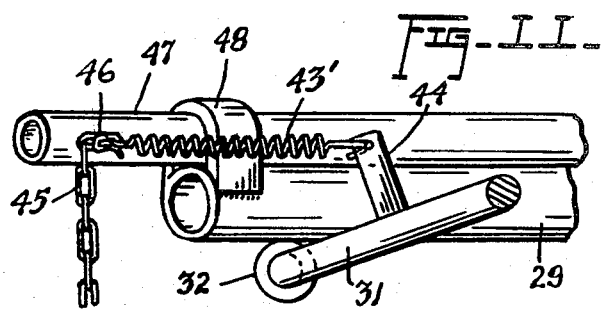

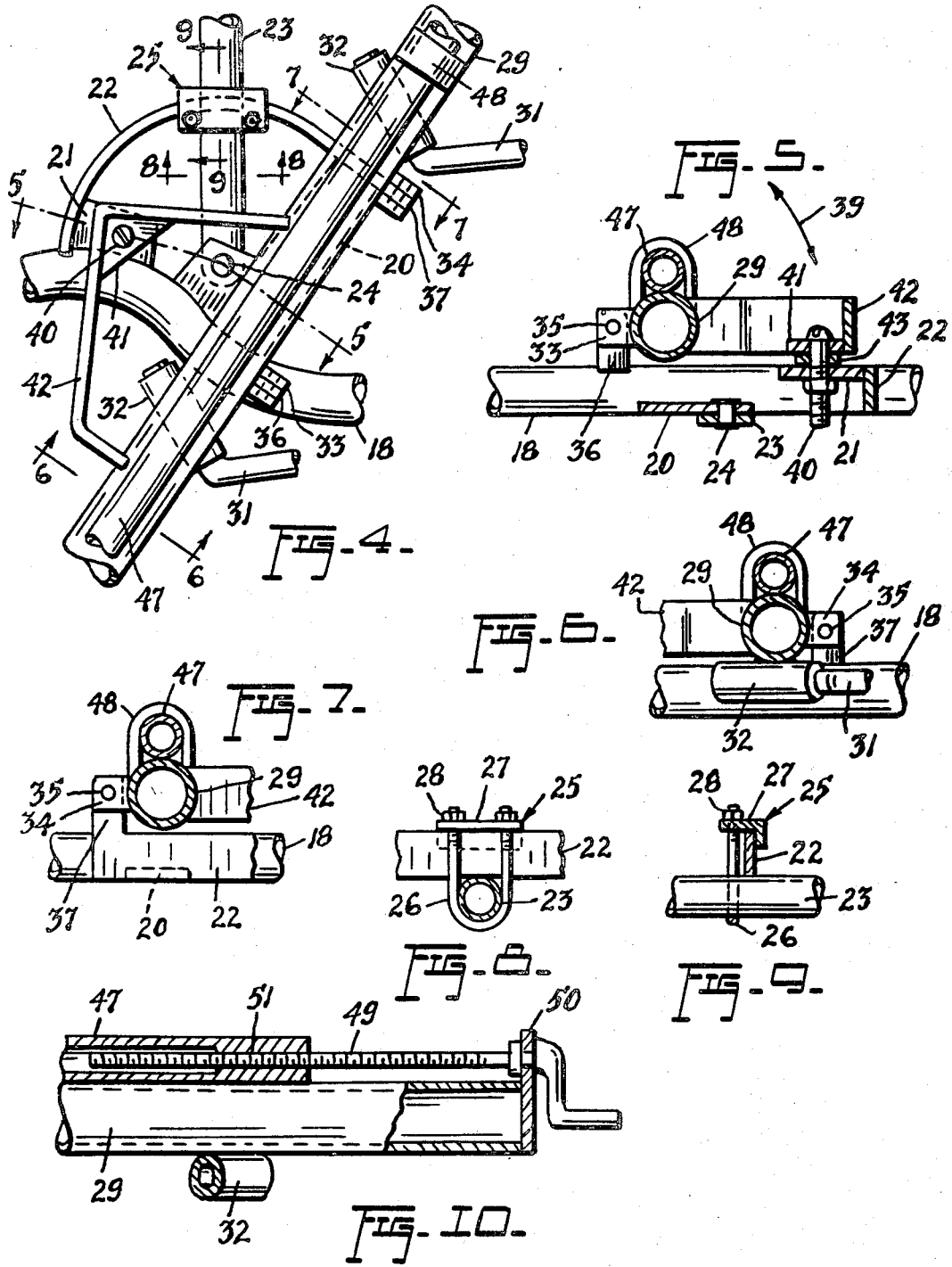

3,406,509
ROTARY SIDE DELIVERY RAKES
George C. Wood, % Darf Corporation,
Edenton, N.C. 27932
Filed June 7, 1965, Ser. No. 461,861
16 Claims. (Cl. 56—377)

ABSTRACT OF THE DISCLOSURE

In a rotary side delivery rake, the combination of a wheeled chassis member disposed generally transversely to the direction of rake travel, a draft bar connected to an intermediate portion of said chassis member and extending forwardly therefrom, an elongated rake frame extending obliquely to said direction of travel and crossing the intermediate portion of said chassis member to project both forwardly and rearwardly therefrom, removable means securing said rake frame to said chassis member, a plurality of rotatable raking wheels, and means mounting said raking wheels on said rake frame for raising and lowering movement of the wheels in mutually parallel planes oblique to said direction of travel, said removable securing means including adjustable pivot means to permit swinging said rake frame about an axis parallel to itself relative to the chassis member and correspondingly tilting said planes of raising and lowering movement of said raking wheels, and means for adjustably rocking said rake frame about said parallel axis.

---

This invention relates to new and useful improvements in rotary side delivery rakes, and while its teachings are applicable to such rakes in general, the invention primarily concerns itself with certain structural and functional improvements in rakes of the type disclosed in my prior Patent No. 3,146,571 dated Sept. 1, 1964, and Patent No. 3,167,900 dated Feb. 2, 1965.

The rakes disclosed in the aforementioned patents include a frame equipped with traveling wheels and having a portion disposed obliquely to the direction of travel, the oblique frame portion carrying a plurality of rotatable raking wheels which are mounted for raising and lowering movement in mutually parallel, vertical planes to compensate for irregularities of the ground.

The principal object of the present invention is to structurally and functionally improve upon the rake arrangement as above outlined, one of the improved features being that the frame of the rake is separated into what may be called a chassis member which carries the traveling wheels, and a rake frame proper which carries the raking wheels, the two units being connected together by separable connecting means so that a rake frame of certain characteristics may be interchangeably applied to a given chassis member, and vice versa.

In the same context and, as a further feature, the separable connecting means include adjustable pivot means whereby the rake frame may be rocked or swung about an axis parallel to itself relative to the chassis member, so that the normally vertical planes of rising and lowering movement of the raking wheels may be cambered or tilted to either or both sides of the vertical, as operating conditions may demand.

As another feature, the present invention provides positively acting means for raising and lowering the raking wheels relative to the rake frame as an operation independent of conditions of ground irregularity, as for example, for raising the several raking wheels off the ground when the rake is to be transported from one location to another.

With the foregoing more important object and features in view and such other objects and features as may become apparent as this specification proceeds, the invention will be understood from the following description, taken in conjunction with the accompanying drawings, wherein like characters of reference are used to designate like parts, and wherein:

FIGURE 1 is a plan view of a rake constructed in accordance with the present invention;

FIGURE 2 is a plan view of the chassis member with its traveling wheels;

FIGURE 3 is a plan view of the rake frame with its raking wheels;

FIGURE 4 is an enlarged, fragmentary plan view showing the connections of the rake frame to the chassis member;

FIGURE 5 is a fragmentary sectional detail, taken substantially in the plane of the line 5—5 in FIGURE 4;

FIGURE 6 is a fragmentary sectional detail, taken substantially in the plane of the line 6—6 in FIGURE 4;

FIGURE 7 is a fragmentary sectional detail, taken substantially in the plane of the line 7—7 in FIGURE 4;

FIGURE 8 is a fragmentary sectional detail, taken substantially in the plane of the line 8—8 in FIGURE 4;

FIGURE 9 is a fragmentary sectional detail, taken substantially in the plane of the line 9—9 in FIGURE 4;

FIGURE 10 is an enlarged sectional view, taken substantially in the plane of the line 10—10 in FIGURE 1; and FIGURE 11 is an enlarged fragmentary sectional view, taken substantially in the plane of the line 11—11 in FIGURE 1.

Referring now to the accompanying drawings in detail, the rotary side delivery rake of the present invention is designated generally by the reference numeral 15 in FIG. 1 and embodies in its construction two main components or units, namely, a chassis unit 16 shown per se in FIG. 2 and a rake unit 17 shown per se in FIG. 3. The chassis unit 16 comprises a chassis member or axle 18 which may be formed from tubular stock and which is disposed generally transversely to the direction of rake travel indicated at D in FIG. 1, the member or axle 18 having a serpentine form substantially as illustrated and being provided at its ends with a pair of traveling wheels 19, rotatable in planes parallel to the direction of travel D.

As is best shown in FIG. 2, the intermediate, reversely S-shaped portion of the chassis member 18 has secured thereto, as by welding, or the like, a horizontally elongated plate 20 and a plate-like bracket 21, while an arcuate strap or bracket member 22 extends from the outer end of the plate 20 to the member 18 where the bracket 21 is provided.

A suitable draft bar 23, of tubular stock for example, is pivotally connected to the plate 20 as by a pivot pin 24, the draft bar projecting forwardly from the chassis member 18 under the lower edge of the strap 22. The curvature of the strap 22 is concentric with the pivot pin 24 and, as shown in FIGS. 8 and 9, clamp means 25 are provided for locking the draft bar in an adjusted angular position relative to the chassis member 18. These clamp means comprise a U-bolt 26 which fits under the bar 23 and extends upwardly through a clamping plate 27 on the upper edge of the strap 22, the desired clamping action being effected by a pair of nuts 28 on the U-bolt 23, as shown.

The rake unit 17 is separate from the chassis unit 16 and comprises an elongated rake frame in the form of a straight tubular body 29 which is disposed obliquely to the direction of travel D and crosses the intermediate portion of the chassis member 18 so as to project both forwardly and rearwardly therefrom. The frame member 29 or body of the rake frame carries a plurality of raking wheels 30 which, as is customary in the art, are rotatable and provided on their periphery with resilient raking teeth or spokes 30'. The wheels 30 are mounted on individual stub axles in the form of angulated rods 31 which in turn are pivotally mounted in tubular bearings 32 secured to the underside of the rake frame 29 so that the raking wheels 30 may rise and fall independently of one another relative to the rake frame, as dictated by irregularities of the ground.

As is best shown in FIGS. 1–4, means are provided for attaching the rake unit 17 to the chassis unit 16, these means comprising pivot lugs 33, 34 which are secured at longitudinally spaced points to one side of the rake frame 29 and are hingedly or pivotally connected by pins 35 to pivot lugs 36, 37, respectively, provided on the chassis member 18 and at one end of the strap 22, as shown in FIG. 2. The lugs and pivot pins 35 are aligned so that the frame 29 may swing or rock about an axis 38 parallel to itself (see FIGS. 2 and 3), as indicated by the arrow 39 in FIG. 5. As a result, the raking wheels 30 may be cambered or tilted to either or both sides of the vertical plane in which they operate, both in terms of rotation and raising or lowering movement, as operating conditions may dictate. The cambering or positioning of the raking wheels in this respect may be locked in an adjusted position by means of a bolt 40 (see FIGS. 4 and 5) which passes through an apertured bracket 41 (see FIG. 3) supported by an angulated strap 42, the ends of which are secured to the rake frame 29 at the side thereof opposite from the pivot lugs 33, 34. The bracket 41 overlies the aforementioned bracket 21 of the chassis member 18 and a spacer 43 of a suitable thickness is interposed on the bolt 40 between the brackets 21, 41 (see FIG. 5), so that when the bolt is tightened, the rake frame 29 with the raking wheels 30 is secured in an adjusted position relative to the chassis member 18 to provide for operation of the raking wheels in a desired plane, either vertical or cambered. It will be understood, of course, that the bracket 21 is apertured like the bracket 41, to accommodate the bolt 40, as will be apparent from FIGS. 2, 3 and 5.

As already stated, the raking wheels 30 by virtue of the mounting rods or arms 31 are free to rise and fall relative to the rake frame 29 as indicated by irregularities of the ground, such rising and falling movement of the wheels taking place independently of each wheel from the others. As in my aforementioned Patents Nos. 3,146,571 and 3,167,900, a tension spring 43' is connected at one end thereof to an upstanding bracket or strap 44 secured to the intermediate portion of the rod or arm 31 of each raking wheel, the spring acting to substantially counter-balance the weight of the wheel so that the raking prongs 30' on the wheel periphery just lightly engage the ground, without having the full weight of the wheel pressing thereon. As is best shown in FIG. 11, the other end of each of the springs 43' has connected thereto a length of chain 45, fastened as a bolt, screw or pin 46 to a shaft 47 carried by the rake frame 29. The fastening element 46 is received selectively in the links of the chain 45, whereby the tension of the associated spring 43' may be adjusted.

The shaft 47, which is preferably tubular stock, is disposed longitudinally on top of and parallel with the rake frame 29 and is slidably mounted thereon by means of inverted U-shaped bearing members 48 which are secured to the rake frame. Means are provided for sliding the shaft 47 in the bearing members 48, these means comprising a screw-threaded crank 49 which is rotatably journalled in a bearing bracket 50 secured to the front end of the frame 29. The screw-threaded crank operatively engages a screw-threaded bore 51 formed in the front end portion of the tubular shaft 47, it being apparent from the foregoing that when the crank 49 is rotated, the shaft 47 will be caused to slide longitudinally relative to the rake frame 29, thus serving, through the medium of the chains 45 and springs 43', to raise or lower the raking wheels 30 relative to the rake frame, such as is advantageous when the rake is to be transported from one location to another and the raking wheels have to be raised off the ground. It will be noted that by manual actuation of the crank 49, all the raking wheels are raised or lowered simultaneously, which raising or lowering movement is entirely independent of that which the wheels automatically follow in response to ground irregularities.

With further reference to the arrangement of the chassis unit 16 and rake unit 17, it will be apparent from FIG. 1 that when the rake unit is superposed on the chassis unit, the chassis member 18 crosses under the rake frame 29 at a point between two adjacent of the bearings 32, so that clearance between the ground and the underside of the rake is kept at an optimum dimension, without the bearings 32 projecting below the plane of the chassis member. Also, it will be noted that all of the raking wheels 30 are disposed at one and the same side of the frame 29, that is, rearwardly thereof with respect to the direction of travel D, and that the chassis member 18 has a straight intermediate portion 18' which passes between two adjacent raking wheels in parallel relation thereto, so that a compact structural assembly of the chassis unit and rake unit is facilitated.

While in the foregoing there has been described and shown the preferred embodiment of the invention, various modifications may become apparent to those skilled in th art to which the invention relates. Accordingly, it is not desired to limit the invention to this disclosure and various modifications and equivalents may be resorted to, falling within the spirit and scope of the invention as claimed.

What is claimed as new is:

1. In a rotary side delivery rate, the combination of a wheeled chassis member disposed generally transversely to the direction of rake travel, a draft bar connected to an intermediate portion of said chassis member and extending forwardly therefrom, an elongated rake frame extending obliquely to said direction of travel and crossing the intermediate portion of said chassis member to project both forwardly and rearwardly therefrom, removable means securing said rake frame to said chassis member, a plurality of rotatable raking wheels, and means mounting said raking wheels on said rake frame for raising and lowering movement of the wheels in mutually parallel planes oblique to said direction of travel, said removable securing means including adjustable pivot means to permit swinging said rake frame about an axis parallel to itself relative to the chassis member and correspondingly tilting said planes of raising and lowering movement of said raking wheels, and said adjustable pivot means including means for securing said rake frame in a tilted position about said parallel axis.

2. The device as defined in claim 1 wherein said raking wheel mounting means are operative to permit independent rising and lowering movement of the raking wheels in accordance with ground irregularities, and means reacting between said rake frame and the raking wheel mounting means for raising and lowering the raking wheels independently of irregularities of the ground.

3. The device as defined in claim 2 wherein said last mentioned means include an actuating shaft parallel to and slidable on said rake frame, said actuating shaft being operatively connected to said raking wheel mounting means, and means for sliding said shaft.

4. A device as defined in claim 1 wherein the draft bar is connected to the chassis member adjacent the point where the chassis member crosses the rake frame.

5. A device as defined in claim 1 wherein the draft bar is pivotally connected to the chassis member adjacent its point of intersection with the rake frame and means including an arcuate member carried by the chassis member and having a curvature concentric with the pivot point of said draft bar for securing said draft bar in adjusted angular position relative to the chassis member and to said rake frame.

6. A device as defined in claim 1 wherein the means for adjustably rocking said rake frame includes bracket means extending outwardly from the rake frame, second bracket means carried by the chassis member, underlying and spaced from the first bracket means, and means for varying the distance between said two bracket means.

7. A device as defined in claim 1 wherein the adjustable pivot means to permit swinging said rake frame about an axis parallel to itself includes co-acting hinge members carried by the rake frame and by the chassis member respectively.

8. A device as defined in claim 1 wherein the adjustable pivot means comprises a pair of hinge members projecting from the rake frame, a complementary pair of hinge members carried by the chassis member and hinge pins connecting said complementary hinge members, said hinge pins extending parallel to the axis of the rake frame itself.

9. In a rotary side delivery rake, the combination of a chassis member disposed generally transversely to the direction of rake travel, traveling wheels provided at the ends of said chassis member, a draft bar connected to an intermediate portion of the chassis member and extending forwardly therefrom, an elongated rake frame extending obliquely to said direction of travel and crossing the intermediate portion of said chassis adjacent the point of connection to said draft bar member to project both forwardly and rearwardly therefrom, adjustable pivot means connecting said rake frame to said chassis member to permit swinging movement of the rake frame relative to the chassis member about an axis parallel to itself, said adjustable pivot means including means for securing said rake frame in a tilted position about said parallel axis, a plurality of rotatable raking wheels, means mounting said raking wheels on said rake frame for independent raising and lowering movement of the raking wheels in accordance with ground irregularities and in mutually parallel planes obliquely to said direction of travel, and means reacting between said rake frame and said raking wheel mounting means for raising and lowering the raking wheels independently of irregularities of the ground.

10. The device as defined in claim 9 wherein said last mentioned means include an actuating shaft parallel to and slidable on said rake frame, said actuating shaft being operatively connected to said raking wheel mounting means, and means for sliding said shaft.

11. The device as defined in claim 9 together with means for adjusting the angular relation of said draft bar relative to said chassis member.

12. The device as defined in claim 9 wherein said rake frame comprises a straight tubular body.

13. The device as defined in claim 9 wherein said rake frame comprises a straight tubular body having said raking wheels disposed on one and the same side thereof.

14. The device as defined in claim 9 wherein said rake frame comprises a straight tubular body, said chassis member having a serpentine form and including a straight portion which passes between two adjacent of said raking wheels.

15. The device as defined in claim 9 wherein said rake frame comprises a straight tubular body having said raking wheels disposed at one and the same side thereof, said chassis member having a serpentine form and including a straight portion which passes between two adjacent of said raking wheels in substantially parallel relation thereto.

16. The device as defined in claim 15 wherein said straight tubular body of said rake frame overlies said chassis member at the point of crossing thereof.

References Cited
UNITED STATES PATENTS

| | | | |
|---|---|---|---|
| 2,933,879 | 5/1960 | Van Der Lely et al. | 56—377 |
| 2,982,081 | 5/1961 | Cooley | 56—377 |
| 3,006,132 | 10/1961 | Van Der Lely et al. | 56—377 X |
| 3,015,202 | 1/1962 | Van Der Lely et al. | 56—377 |

ABRAHAM G. STONE, *Primary Examiner.*

P. A. RAZZANO, *Assistant Examiner.*